(12) United States Patent
Kubo et al.

(10) Patent No.: US 6,408,127 B1
(45) Date of Patent: Jun. 18, 2002

(54) IMAGE PROCESSING APPARATUS

(75) Inventors: Ryoji Kubo, Tokyo; Hiroyuki Horii; Yoichi Yamagishi, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/074,008

(22) Filed: May 7, 1998

Related U.S. Application Data

(62) Division of application No. 08/123,899, filed on Sep. 20, 1993, now Pat. No. 5,777,691, which is a continuation of application No. 07/715,810, filed on Jun. 14, 1991, now abandoned, which is a division of application No. 07/343,368, filed on Apr. 26, 1989, now abandoned.

(30) Foreign Application Priority Data

| Apr. 27, 1988 | (JP) | 63-102631 |
| Apr. 27, 1988 | (JP) | 63-102632 |
| Apr. 27, 1988 | (JP) | 63-102633 |
| Apr. 27, 1988 | (JP) | 63-102634 |
| Apr. 27, 1988 | (JP) | 63-102635 |
| Apr. 27, 1988 | (JP) | 63-102636 |
| Apr. 27, 1988 | (JP) | 63-102637 |
| Apr. 27, 1988 | (JP) | 63-102638 |
| Apr. 27, 1988 | (JP) | 63-102639 |

(51) Int. Cl.⁷ .............................................. H04N 9/79
(52) U.S. Cl. ................. 386/1; 386/8; 386/13
(58) Field of Search ................. 386/46, 52, 77, 386/92, 8, 78, 84, 1, 7, 13, 44; 348/565; H04N 9/79

(56) References Cited

U.S. PATENT DOCUMENTS

| 4,272,787 A | * | 6/1981 | Michael et al. | 386/8 |
| 4,298,896 A | | 11/1981 | Heitmann | 358/160 |
| 4,831,441 A | | 5/1984 | Ando | 358/11 |
| 4,602,275 A | | 7/1986 | Smith et al. | 358/11 |
| 4,636,857 A | | 1/1987 | Achida et al. | |
| 4,746,979 A | | 5/1988 | Kashigi | 358/160 |
| 4,761,686 A | | 8/1988 | Willis | 358/160 |
| 4,796,123 A | * | 1/1989 | Takeuchi et al. | 386/77 |
| 4,839,748 A | * | 6/1989 | Ishii | 386/77 |
| 4,853,765 A | | 8/1989 | Katsumata et al. | 348/560 |
| 4,864,402 A | | 9/1989 | Ebihara et al. | 358/160 |
| 4,890,168 A | * | 12/1989 | Inoue et al. | 348/565 |
| 5,005,073 A | | 4/1991 | Rufray et al. | 358/11 R |
| 5,019,908 A | | 5/1991 | Su | 348/559 |

FOREIGN PATENT DOCUMENTS

| EP | 0169527 | 1/1986 | | 358/140 |
| JP | 0039182 | 3/1984 | | |
| JP | 0154983 | 7/1987 | | H04N/5/907 |
| JP | 36034770 A | * | 2/1988 | H04N/5/92 |
| JP | 0031580 | 2/1990 | | H04N/7/010 |

* cited by examiner

Primary Examiner—Huy Nguyen
(74) Attorney, Agent, or Firm—Fitzpatrick, Cella, Harper & Scinto

(57) ABSTRACT

An image processing apparatus, for an image recording and reproducing system, comprises a means for writing a given field image signal in a field memory, and a means for reading out the field image signal written in the field memory. The reading means reads out individual lines in sequence in a first field of the field image signal and also reads out a plurality of lines in a second field of the field image signal concurrently.

6 Claims, 12 Drawing Sheets

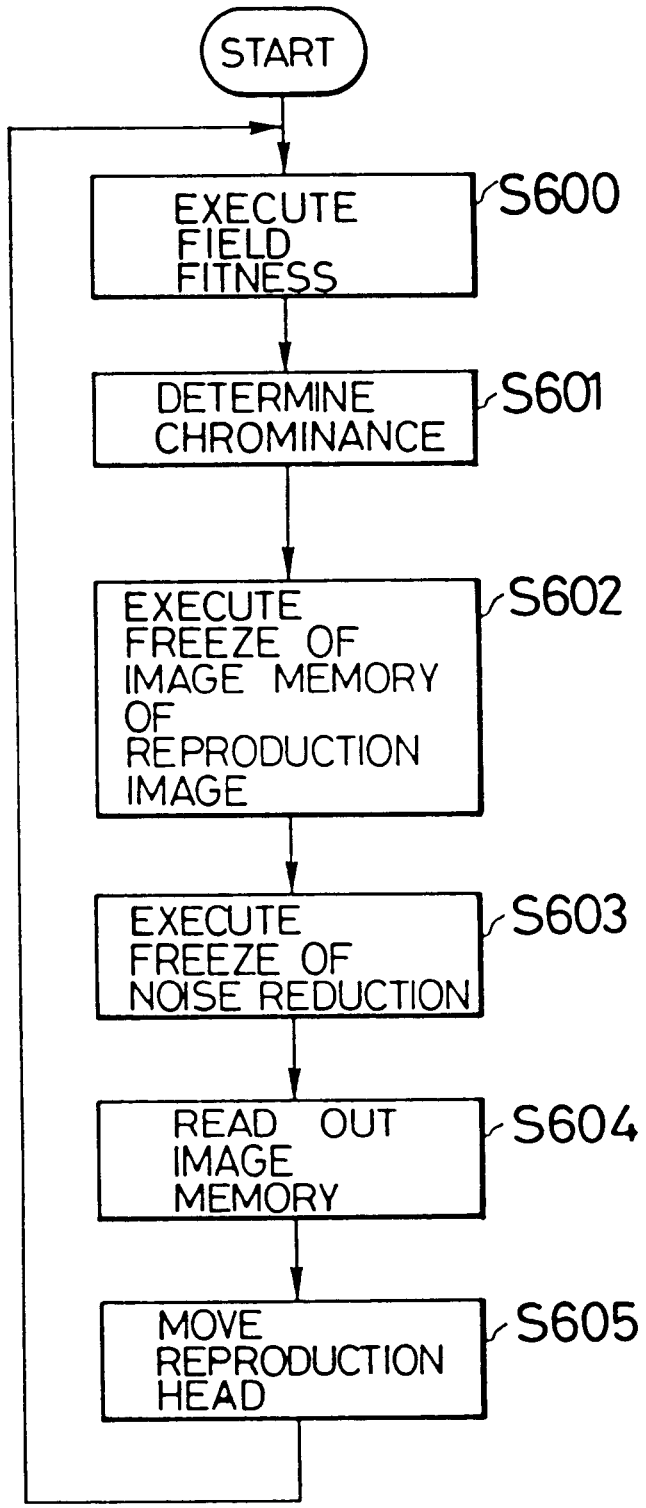

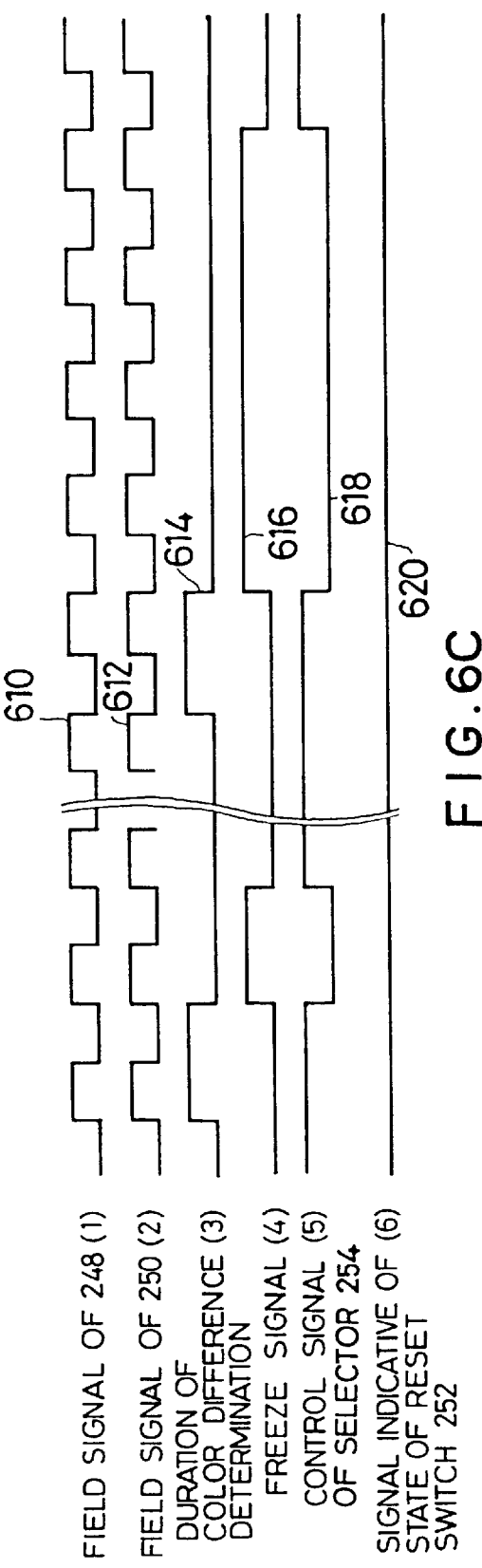

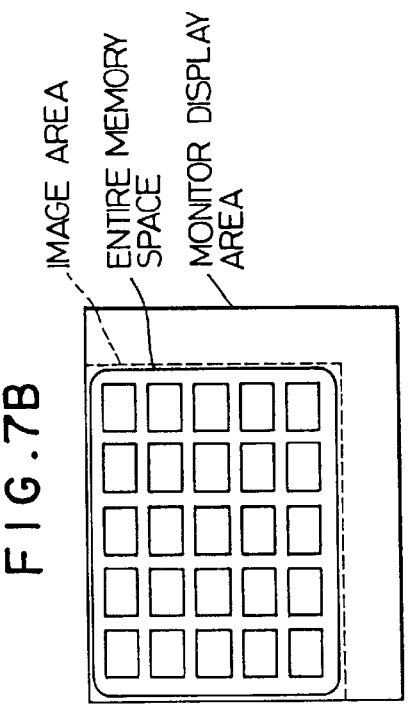
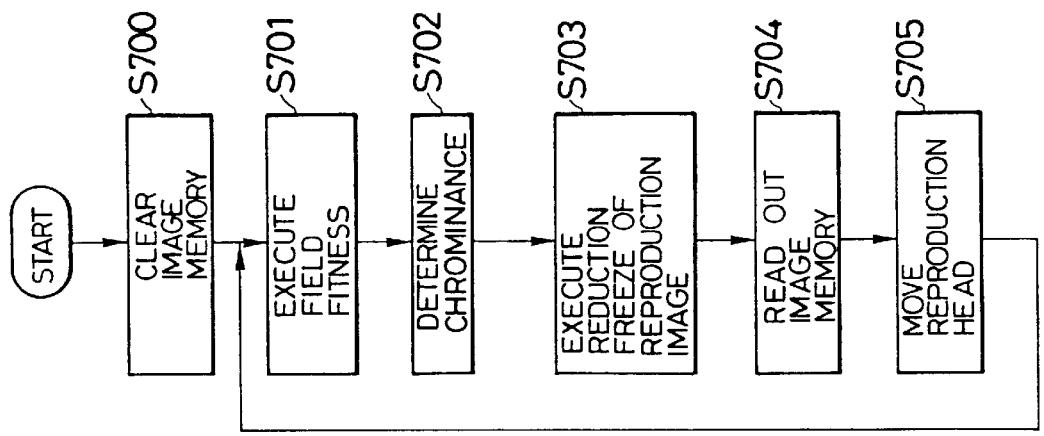

IMAGE PROCESSING APPARATUS

This application is a division of application Ser. No. 08/123,899, filed Sep. 20, 1993, now U.S. Pat. No. 5,777,691, issued Jul. 7, 1998, which is a continuation of application Ser. No. 07/715,810, filed Jun. 14, 1991, now abandoned, which is a division of application Ser. No. 07/343,368, filed Apr. 26, 1989, now abandoned.

BACKGROUND OF THE INVENTION

1. Field of the Invention

The present invention relates to an image processing apparatus, and more particularly to digital signal processing from image processing apparatus.

2. Related Background Art

FIGS. 8A and 8B are block diagrams of conventional constructions of apparatuses for processing sequential color difference line signals, e.g., signal processing circuits in a still video system, respectively showing the construction for brilliance signals and the construction for chrominance signals. In FIG. 8A reference numeral 800 designates an input terminal for a brilliance signal reproduced from a magnetic sheet which is a magnetic recording medium; 802, a delay line of 1H (1 horizontal scanning time); 804, a switch for selecting a reproduced brilliance signal of the input terminal 800 or a delay signal of the delay line 802; 806, an adder for adding the output of the switch 804 and the output of the delay line 802 and for taking an average; 808, a delay line of 1/2H; 810, a switch for selecting the output of the delay line 802 or the output of the delay line 808; and 812, an output terminal for the signal selected by the switch 810.

In FIG. 8B, 814 designates an input terminal for reproduction line sequential chrominance signals reproduced from the magnetic sheet; 816, a delay line of 1/2H; 818, a switch for selecting the reproduction line sequential chrominance signals or the output of the delay line 816; 820, 822, delay lines of 1H; 824, a switch for selecting the output of the switch 818 or the output of the delay line 822; 826, an adder for adding the output of the switch 824 and the output of the delay line 822 and for taking an average; 828, 830, switches for selecting the output of the delay line 820 or the output of the adder 826; and 832, 834, output terminals for the signals selected by the switches 828, 830.

The reproduced brilliance signals to be inputted to the input terminal 800 are represented by $Y_0, Y_1, Y_2, Y_3, Y_4, Y_5, \ldots$ orderly raster by raster. The switch 804 normally selects the input terminal 800, and it shifts to the output of the delay line 802 when a drop-out occurs in the reproduction signal. The adder 806 adds the output of the switch 804 and the output of the delay line 802 and takes an average, and outputs $(Y_0+Y_1)/2, (Y_1+Y_2)/2, (Y_2+Y_3)/2, (Y_3+Y_4)/2, (Y_4+Y_5)/2, \ldots$ When a frame picture on the magnetic sheet is to be reproduced, the switch 810 normally selects the output of the delay line 802; when a field picture is to be reproduced, the switch 810 shifts field by field.

The reproduction line sequential chrominance signals to be inputted to the input terminal 814 are represented by $RY_0, BY_1, RY_2, BY_3, RY_4, BY_5, RY_6, By_7, \ldots$ orderly raster by raster. The switch 824 normally selects the output of switch 818, and it shifts to select the output of the delay line 822 when a drop-out occurs. The adder 826 adds the output of the delay line 822 and the output of the switch 824 and takes an average, and outputs $(RY_0+RY_2)/2, (BY_1+BY_3)/2, (RY_2+RY_4)/2, (BY_3+BY_5)/2, (RY_4+RY_6)/2, (BY_5+BY_7)/2, \ldots$ By the shifting of the switches 828, 830, $RY_0, (RY_0+RY_2)/2, RY_2, (RY_2+RY_4)/2, RY_4, (RY_4+RY_6)/2, RY_6, \ldots$ are outputted to the output terminal 832, and 1H later from this, $BY_1, (BY_1+BY_3)/2, BY_3, (BY_3+BY_5)/2, BY_5, (BY_5+BY_7)/2, BY_7, \ldots$ are outputted to the output terminal 834. When a frame picture on the magnetic sheet is to be reproduced, the switch 818 normally selects the input terminal 814; when a field picture is to be reproduced, the switch 818 shifts field by field.

However, with this conventional arrangement, since many delay lines 802, 808, 816, 820, 822 are included, the number of parts to be adjusted at the stage of production or assembly would be increased. Secularly, the temperature characteristics, frequency characteristics, and S/N ratio of these delay lines would be varied and impaired. Further, the system furnished with image memories requires relatively large-sized circuits.

Conventionally, in an image recording and reproducing system having an image memory, when memorizing in the image memory an input image as reduced, the frequency of a clock, for forming a horizontal address signal to be impressed in the image memory, is divided by N (N is a positive integer), and the frequency of a horizontal synchronizing signal, for generating a vertical address signal, is divided by M/M (M is a positive integer). By this process, the input signal is reduced to 1/N horizontally and to 1/M vertically, and as a result, a reduced image of a 1/N×1/M size is memorized in the image memory.

However, in the conventional apparatus, an input image is memorized in the image memory simply by cutting out. Accordingly, in a still video system for processing chrominance signals in line sequence, when reducing the input image to a ¼×¼ size, for example, if the input image starts with R-Y components, i.e. $RY_0, BY_1, RY_2, BY_3, RY_4, BY_5, RY_6, BY_7, RY_8, BY_9, RY_{10}, BY_{11}, \ldots$ every fourth raster is sampled. As a result, only R-Y components, i.e. $RY_0, RY_4, RY_8, \ldots$ are stored in the image memory, while B-Y components are completely omitted.

Further, when reducing the input image to a ⅕×⅕ size, every fifth rasters, i.e. $RY_0, BY_5, RY_{10}, \ldots$ is memorized in the image memory and, as a result, other color different information is omitted in part. However, in the case where a lot of image information as reduced was stored in the image memory for the purpose of multi-screen display, because there is no priority between chrominance signals to be inputted, a single raster necessarily contains R-Y components and B-Y components in combination, which is very difficult to read out to output normally.

Especially when memorizing an input image, as reduced, in the image memory, the input image is written in the image memory with image areas of the input image reduced. Therefore, as shown in FIG. 10, if the reduced image is stored in a checked fashion, the image can be displayed only incompletely on a monitor screen; that is, part of the reduced image is omitted.

Another problem with the conventional arrangement is that when overlapping the reduced and memorized image over an input image, it requires, in addition to a signal indicative of an image zone of the reduced image, a signal indicative of a frame zone where the reduced image is to be framed.

Moreover, in the conventional image recording and reproducing system, when a framed image of a reproduction video signal from the magnetic recording medium is to be memorized in the image memory while a stationary image is being read out as the framed image from the image memory, the relationship between the field of an image outputted from the image memory and the field of an image inputted into the image memory has not been considered. Thus the reproduction video signal is merely written in the image memory.

However, if the field of an image outputted from the image memory does not coincide with the field of an input image (reproduction video signal) when a framed image from the magnetic recording medium is to be reproduced to store in the image memory, a skew distortion in the output image would occur during that time.

Yet if the two same fields of image signals are inputted in a frame memory and then are read out the field video signals one after another, a skew distortion would still occur due to the inconsistence of the fields.

Heretofore, as a means for processing video signals, a clamping circuit generally called "clamp" is known.

Generally, in the apparatus furnished with an image memory, any DC component of an input video signal is cut off by a condenser prior to using this video signal. But, for example, if the input video signal is to be stored in the image memory, the size of the cut-off DC components is one of the significant factors. This is the reason why a clamping process is necessary.

FIG. 9 illustrates a conventional clamping circuit, in which; reference numeral 900 designates an input terminal for an analog video signal; 902, a control terminal for impressing a clamp pulse; and 904, an output terminal for a clamped signal. An output signal from the output terminal 904 is normally supplied to an A/D converter (not shown). An video signal to be inputted to the input terminal 900 is amplified in terms of current by a transistor 906, and any DC component of the signal are cut off by a condenser 908. When a clamp pulse to be impressed to the control terminal 902 is "high level", a constant potential to be determined according to a constant-voltage diode 910 appears at a base of the transistor 912; and when it is "low level", the potential is held by the condenser 908. Thus the signal from the output signal 904 is clamped in the potential as determined according to the constant-voltage diode 910.

The foregoing conventional apparatus has the following problems. Considering that an clamp output is to be A/D-converted and stored in the image memory, if an offset adjustment is not made in 1 LSB unit when the video component of an input video signal is zero (nil), an error would occur between a brilliance signal and a chrominance signal or between red, green and blue color signals. It is very difficult to eliminate such error, requiring a high-precision adjustment. Further, because the clamping speed is low, it is impossible to make a clamp in one raster unit.

In recording an input video signal from the exterior in the magnetic recording medium as a field image, one field of the input video signal is recorded as it is, and the recorded one field is read out repeatedly. Therefore, the other field of image information is omitted, and as a result, any oblique line of the image would be in a stepped or jogged shape, causing a lack of easiness or smoothness in the image so that the image is difficult to see well.

SUMMARY OF THE INVENTION

It is therefore an object of the present invention to provide an image memorizing apparatus which can eliminate the foregoing problems collectively or individually.

Another object of the invention is to provide an image memorizing apparatus which can eliminate the foregoing problems collectively or individually by employing an image memory.

Still another object of the invention is to provide an image memorizing apparatus which can realize a reproducing process by utilizing an image memory effectively.

According to the present invention, there is provided an image memorizing apparatus in which from an image memory, a normal reading-out is made with respect to one field, and two adjacent rasters are read out at the same time with respect to the other raster to output a sum and an average.

A further object of the invention is to provide an image memorizing apparatus in which two chrominance data can be stored neither more or less when memorizing an image, as reduced, in the image memory.

A still further object of the invention is to provide an image memorizing apparatus in which a given image signal can be framed by employing an image memory.

An additional object of the invention is to provide an image memorizing apparatus comprising a new clamp circuit which has been advanced over the conventional clamp circuit.

A still additional object of the invention to provide an image memorizing apparatus in which the occurrance of a skew distortion can be prevented by employing an image memory.

Many other objects, advantages and features of the present invention will become manifest to those versed in the art upon making reference to the following detailed description and the accompanying drawings in which an embodiment incorporating the principles of the present invention is shown by way of illustrative example.

BRIEF DESCRIPTION OF THE DRAWINGS

FIG. 6A is a flow chart of a reproducing mode;

FIGS. 6B and 6C are time charts of the reproducing mode;

FIG. 7A is a flow chart of a multi-screen freeze;

FIG. 7B illustrates a 5×5 multi-screen;

DESCRIPTION OF THE PREFERRED EMBODIMENT

The principles of the present invention are particularly useful when embodied in an image processing apparatus for a still image recording and reproducing system.

Figure 2:
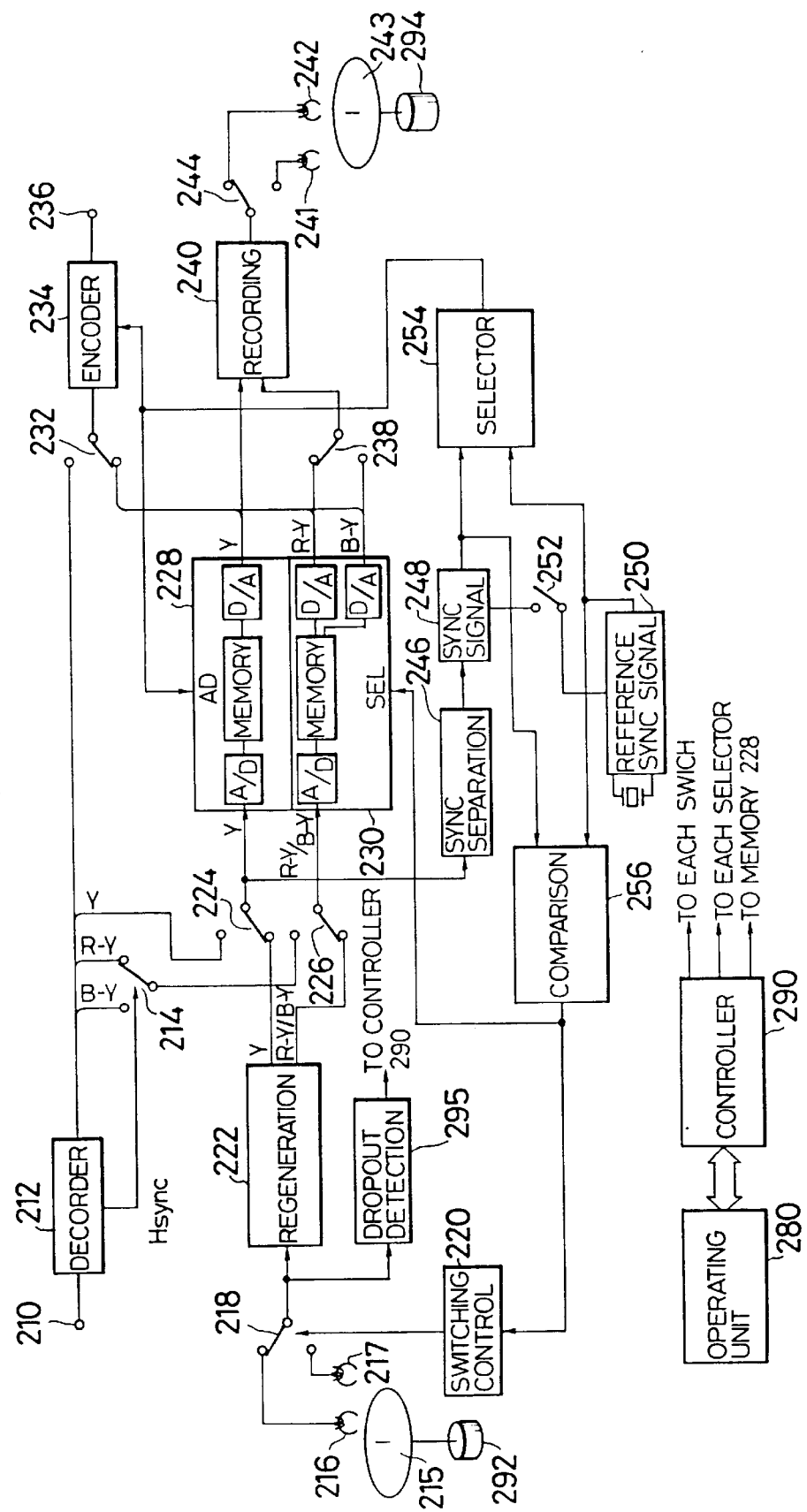
FIG. 2 is a block diagram of an apparatus embodying the present invention.

FIG. 2 is a block diagram of the still image recording and reproducing system. The system comprises a video input terminal 210 for inputting a video signal from the exterior, a decoder 212 for separating the video signal into a brilliance signal and chrominance signals, and a switch 214 operable to shift in synchronizm with a horizontal synchronizing signal $H_{sync}$ from the decoder 212 for converting two color difference signals R-Y, B-Y, outputted from the decoder 212, to line-sequence chrominance signals. The system also comprises magnetic heads 216, 217 for reproducing video signals recorded on a magnetic recording medium in the form of a magnetic sheet 215, a switch 218 for selecting one of the magnetic heads 216, 217, a change-over control circuit 220 for controlling the change-over of the switch 218, a reproducing circuit 222 for demodulating the reproduction outputs of the magnetic heads 216, 217 and for outputting a brilliance signal and a line-sequence chrominance signal, a switch 224 for selecting a brilliance signal from the decoder 212 or a brilliance signal from the reproducing circuit 222, and a switch 226 for selecting a line-sequence chrominance signal from the decoder 212 or a line-sequence chrominance signal from the reproducing circuit 222.

Designated by 228, 230 are image memory circuits each composed of an A/D converter, an image memory and a D/A converter; one image memory circuit 228 is for brilliance signals, and the other image memory circuit 230 is for chrominance signals. The image memory circuit 230 outputs chrominance signals in line synchronizm. The system also comprises a switch 232 for selecting the output (a brilliance signal and two chrominance signals) of the decoder 212 or the outputs of the image memory circuits 228, 230, an encoder 234 for processing, such as modulating and composing, the brilliance signal and the chrominance signals from the switch 232, and an output terminal 236 for a combined video signal.

Designated by 238 is a switch for converting two chrominance signals, outputted from the image memory circuit 230, in line sequence, and the switch 238 is operable to shift in synchronism with a horizontal synchronizing signal. The system further includes a recording circuit 240 for various process for the magnetic recording, e.g., modulating the brilliance signal and the chrominance signals from the image memory circuit 228 and the image memory circuit 230 (precisely, switch 238), magnetic heads 241, 242 for magnetically recording on a magnetic sheet 243 signals from the recording circuit 240, and a switch 244 for selecting one at a time between the magnetic heads 241, 242.

Additionally, the system includes a synchronization and separation circuit 246 for separating the synchronizing signal from the brilliance signal selected by the switch 224, a synchronizing signal generating circuit 248 for generating various synchronizing signals, i.e., a clock pulse in synchronism with a horizontal synchronizing signal outputted from the synchronization and separation circuit 246, and horizontal and vertical synchronizing signals, and a reference synchronizing signal generating circuit 250 for generating various synchronizing signals, i.e., a clock pulse by a crystal vibrator, and horizontal and vertical synchronizing signals. As a reset switch 252 is switched on, the reference synchronizing generating circuit 250 assumes a reset position by the horizontal and vertical signal from the exterior. 254 designates a selector for selecting the output of the synchronizing signal generating circuit 248 or the output of the reference synchronizing signal generating circuit 250; such selection signal is impressed to the image memory circuits 228, 230 and the encoder 234. 256 designates a comparator circuit for comparing the fields of the synchronizing signals outputted from the circuits 248, 250 and for controlling both the change-over of the magnetic heads by the change-over control circuit 220 and the writing in the image memory circuits 228, 230, depending on whether the two fields are coincident with each other or not.

Further, 280 designates an operation unit for issuing to the apparatus of the present invention various commands, such as a command for recording, a command for reproducing, a command for reducing the image and a command for multiple images. 290 designates a controller for changing over or actuating the individual switches in the apparatus according to the operation of the operation units 280 to control both the writing in the image memory 228 and the reading-out therefrom. 292, 294 designate motors for rotating the magnetic sheets 215, 243, respectively. 295 designates a drop-out detecting circuit.

In FIG. 2, in the recording mode for recording on the magnetic sheet 243 a video signal from the exterior, the switches 224, 226 shifts to the decoder 212. The input signal of the input terminal 210 is separated into a brilliance signal and two color difference signals by the decoder 212; the brilliance signal is impressed to the image memory circuit 228 via the switch 224, while the chrominance signals are arranged in line sequence by the switch 214 and then impressed to the image memory circuit 230. By depressing a non-illustrated recording command key, these signals are memorized in the image memory circuits 228, 230.

At that time, the selector 254 selects the synchronizing signal generating circuit 248 so that the image memory circuits 228, 230 and the encoder 234 operate according to a synchronizing signal from the circuit 248. A motor (not shown) for rotating the magnetic sheet 243 is normally in rotation in synchronizm with a vertical synchronizing signal outputted from the reference synchronizing signal generating circuit 250. As the reset switch 252 is switched on, the motor is reset so as to synchronize with the input video signal from the exterior.

Then, the selector 254 selects the reference synchronizing signal generating circuit 250 so that the image memory circuits 228, 230 and the encoder 234 operate according to a synchronizing signal from the circuit 250. The image memory circuits 228, 230 thereby assume their reading-out posture to output a brilliance signal and two chrominance signals, respectively. The color difference signals are arranged in line sequence by the switch 238. The recording circuit 240 performs the recording process, and the output of the recording circuit 240 is recorded on the magnetic sheet 243 by the magnetic heads 241, 242. During the time of recording on the magnetic sheet 243 (2 vertical synchronization time, i.e. 2V if the image is a framed image; 1V if the image is a field image), the reset switch 252 should be off.

After completion of recording to the magnetic sheet 243, the selector 254 selects the synchronizing signal generating circuit 248 again. In this case, the image memorized in the image memories 228, 230 is read out on a reduced scale, an overlapping signal over the input video signal is impressed to the encoder 234 by the change-over control of the switch 232. The video signal from the output terminal 236 exhibits, at a portion of the image of is the input video signal, a reduced image corresponding to the image recorded on the magnetic sheet.

In the reproducing mode in which recording signals on the magnetic sheet 215 are to be reproduced, the reproducing outputs of the magnetic heads 216, 217 are modulated by the reproducing circuit 222, and are impressed to the image memory circuits 228, 230 via the switches 224, 226 and are then memorized in the image memory circuits 228, 230. Concurrently with this memorizing, the memorized image information is read out; the outputs of the image memory circuits, 228, 230 are supplied to the output terminal 236 via the switch 232 and the encoder 234. At that time, the selector 254 should select the synchronizing signal generating circuit 248, and the reset switch 252 should be off.

Upon completion of writing in the image memory circuits 228, 230, the selector 254 selects the reference synchronizing signal generating circuit 250 so that the image memory circuits 228, 230 assume their reading-out posture.

Figure 1A:
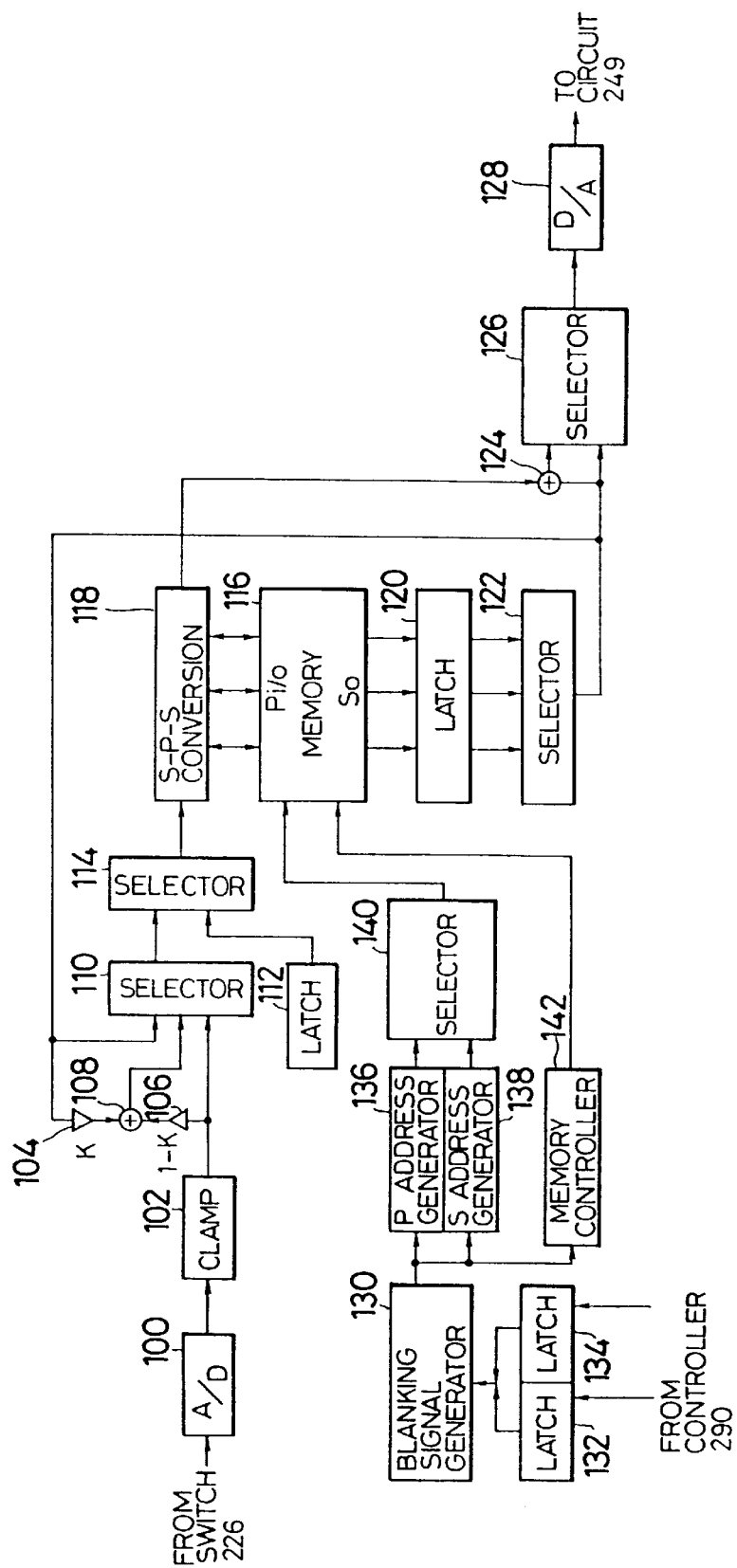
FIG. 1A is a block diagram of an image memory circuit for brilliance signals.

FIG. 1A is a detail block diagram of the image memory circuit 228. As shown in FIG. 1A, the image memory circuit 228 comprises an A/D converter 100 for digitalizing an analog brilliance signal inputted, a clamping circuit 102, a multiplier 104 for K (0<K<1), a multiplier 106 for (1−K), an adder 108 for adding the outputs of the multipliers 104, 106, a selector 110 for selecting one between the inputs of the multipliers 104, 106 and the output of the adder 108, a latching circuit for holding predetermined data, a selector 114 for selecting one between the output of the selector 110 and the output of the latching circuit 112, a dual-port image memory 116 having a random access port (hereinafter called "P port") and a serial output port (hereinafter called "S port"), and an S-P-S converting circuit 118 for latching three image elements of the image data from the selector 114 to output them in parallel and for outputting in series three image elements of the image data outputted from the image memory 116.

The image memory circuit 228 also comprises a latching circuit 120 for temporarily holding three image elements of the image data outputted from the S port of the image memory 116, a selector 122 for changing over and selecting the output of the latching circuit 120 according to the video rate, an adder 124 for adding the image data from the S-P-S converting circuit 118 and the image data from the selector 122, a selector 126 for selecting one between the output of the adder 124 and the output of the selector 122, and a D/A converter 128 for converting the output data of the selector 126 into an analog signal.

The image memory circuit 228 further comprises a blanking signal generating circuit 130 for outputting a signal indicative of a blanking zone, latching circuits 132, 134 for holding signals for determining a blanking zone, a P address signal generating circuit 136 for generating an address signal (hereinafter called "P address signal") for the P port of the image memory 116, an S address signal generating circuit 138 for generating an address signal (hereinafter called "S address signal") for the S port of the image memory 116, a selector 140 for selecting one between the output of the P address signal generating circuit 136 and the output of the S address signal generating circuit 138, and a memory control circuit 142 for controlling the image memory 116.

Figure 1B:
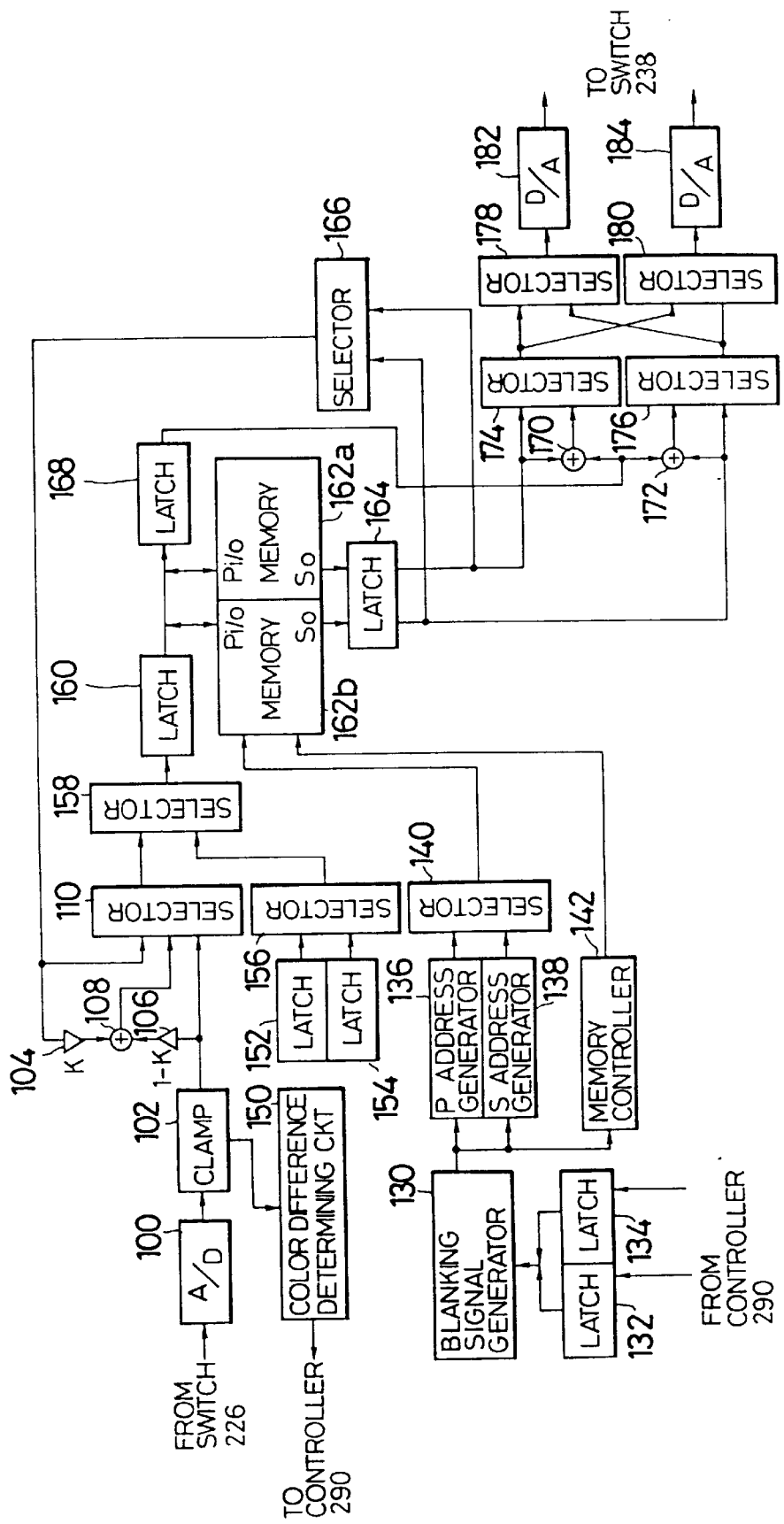
FIG. 1B is a block diagram of an image memory circuit for line-sequence chrominance signals.

FIG. 1B is a detail block diagram of the image memory circuit 230. In FIG. 1B, reference numerals 100 through 110 designate various circuits which are similar to those designated by like reference numerals in FIG. 1A, except that the brilliance signals are replaced by the line-sequence chrominance signals. The functions of circuits 130 through 142 are similar to those of the corresponding circuits of FIG. 1A. The image memory circuit 230 comprises a color difference discrimination circuit 150 for discriminating the chrominance signals R-Y, B-Y of line-sequence chrominance signals, latching circuits 152, 154 for holding predetermined data, a selector 154 for selecting one between the output of the latching circuit 152 and the output of the latching circuit 154, a selector 158 for selecting one between the output of the selector 110 and the output of the selector 156, a latching circuit 160 for storing the image data from the selector 158 at a speed equal to ⅓ of the video rate, a dual-port image memory 162 (162a, 162b) similar to the image memory 116, a latching circuit 164 for holding two image data outputted from the S port of the image memory 162, a selector 166 for selecting one between the two outputs from the latching circuit 164, a latching circuit 168 for storing the image data outputted from the P port of the image memory 162 at a speed equal to ⅓ of the normal video rate, namely, sampling at a ⅓ speed, adders 170, 172 for adding the output of the latching circuit 168 to the output of the latching circuit 164, selectors 174, 176 each for selecting one between the output of the latching circuit 164 and the outputs of the adders 170, 172, selectors 178, 180 for selecting one between the output of the selector 174 and the output of the selector 176, and D/A converters 182, 184.

Figure 3A:
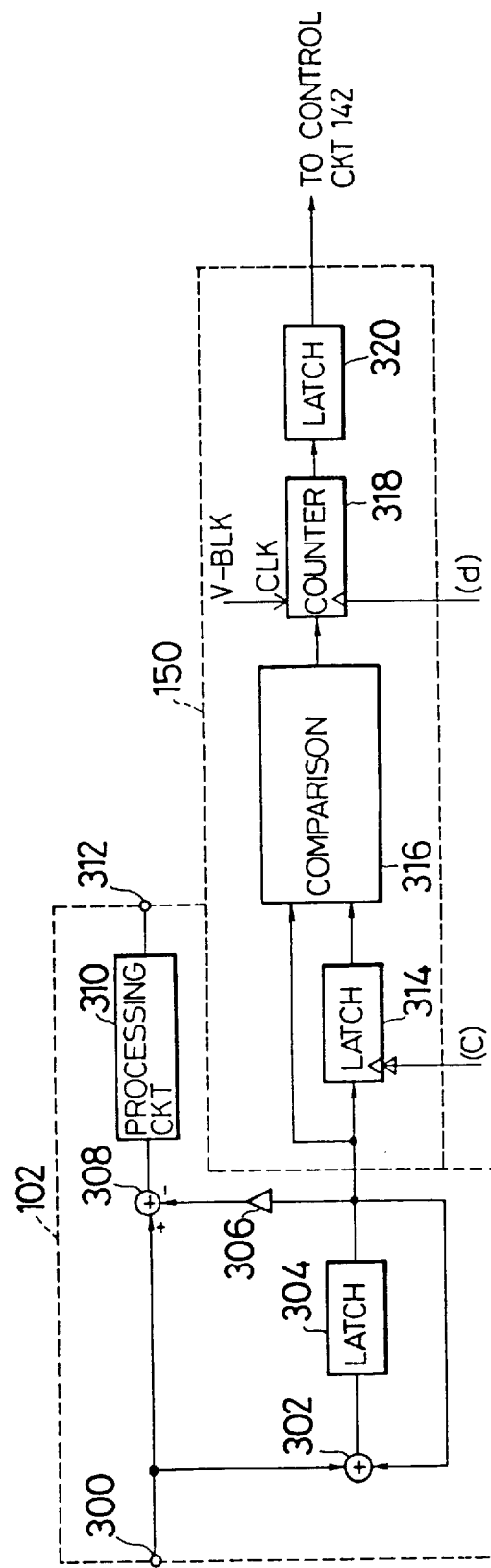
FIG. 3A is a detail block diagram showing a clamp circuit of FIG. 1A and a color difference discrimination circuit of FIG. 1B.

FIG. 3A is a detail block diagram of the clamping circuit 102 of FIGS. 1A and 1B and the color difference discrimination circuit 150 of FIG. 1B. As shown in FIG. 3A, the clamping circuit 102 comprises an input terminal 300 for the image data from the A/D converter 100, an adder 302, a latching circuit 304 for accumulating the output data of the adder 302 n (integer larger than 1) times, a multiplier 306 for multiplying the output of the latching circuit 304 by 1/n (n stands for an integer larger than 1), a subtracter 308 for subtracting the output data of the multiplier 306 from the input data of the input terminal 300, a processing circuit 310 for performing an appropriate process when any overflow or underflow occurs in the output data of the subtracter 308, and an output terminal 312 for outputting the output data of the processing circuit 310, the output terminal 312 being connected to the multiplier 108 and the selector 110. The chrominance discrimination circuit 150 comprises a latching circuit 314 for holding the output of the latching circuit 304 in a specific timed relation, a comparator circuit 316 for comparing the output of the latch circuit 304 and the output of the latching circuit 314, a counter 318 for counting the compared result of the comparator circuit 316, and a latching circuit 320 for indicating, as a flag, whether the counted result has exceeded a predetermined value or not.

The circuits 102 and 150 operate as follows. If the image data to be inputted to the input terminal 300 is the brilliance signal data, the latching circuit 304 is cleared to a zero state during the period of horizontal synchronizing time. A clock pulse is impressed n (any integer larger than 1) times to the latching circuit 304 during the back porches of the input image data, and the individual results are accumulated. The adder 302 adds the output of the latching circuit 304 to the input image data and impresses the added result to the latching circuit 304. By this loop, data during the back porches, namely, the value obtained by adding the pedestal level value n times are stored in the latching circuit 304.

Subsequently, the output of the latching circuit 304 is multiplied by 1/n by the multiplier 306 to obtain an average value of the total result accumulated by adding n times. If the output of the multiplier 306 is subtracted from the input image data by the subtracter 308, the image data of the output terminal 312 are clamped at $00_{HEX}$. If an underflow of the output of the subtracter 308 occurred, the image data of the output terminal 312 should be $00_{HEX}$ compulsorily by the processing circuit 310.

In FIG. 3A, if the input image data are line-sequence color difference signal data, it can be clamped at $00_{HEX}$ like in the case of brilliance signal data. However, since the color difference signals have positive and negative polarities, assuming that $80_{HEX}$ is defined as 0 V, it is necessary to clamp the image data at $80_{HEX}$. This is, to perform the clamping at $80_{HEX}$, $$RY/BY(t) - \left(1/n\sum_{i=1}^{n} P_i - 80_{HEX}\right) = \left(RY/BY(t) - 1/n\sum_{i=1}^{n} P_i\right) + 80_{HEX}$$

wherein the input image data is RY/BY(t), and the average value of the total result accumulated at a pedestal level by adding n times is $$1/n\sum_{i=1}^{n} P_i$$

This is equal to the result obtained by adding $80_{HEX}$ to the $00_{HEX}$.

There exists normally no burst signal in the brilliance signal and the color difference signals outputted from the decoder 212; however, a small-amplitude burst signal could remain if there is a leak in the circuit. Such burst signal when clamping can be cancelled by the following condition:

Frequency of the clock pulse to be impressed to the latching circuit 304 during the back porch (burst signal time):

2 $mf_{sc}$ (m stands for a positive integer, $f_{sc}$ stands for a sub-carrier frequency), Number of additions (accumulation): 2 1

(1 stands for a positive integer),

Modulus of the Multiplier 306: ½ 1.

This can be adopted, in addition to the clamping of the brilliance signal and the chrominance signals, to the clamping of an NTSC signal in which a burst signal exists.

Figure 3B:
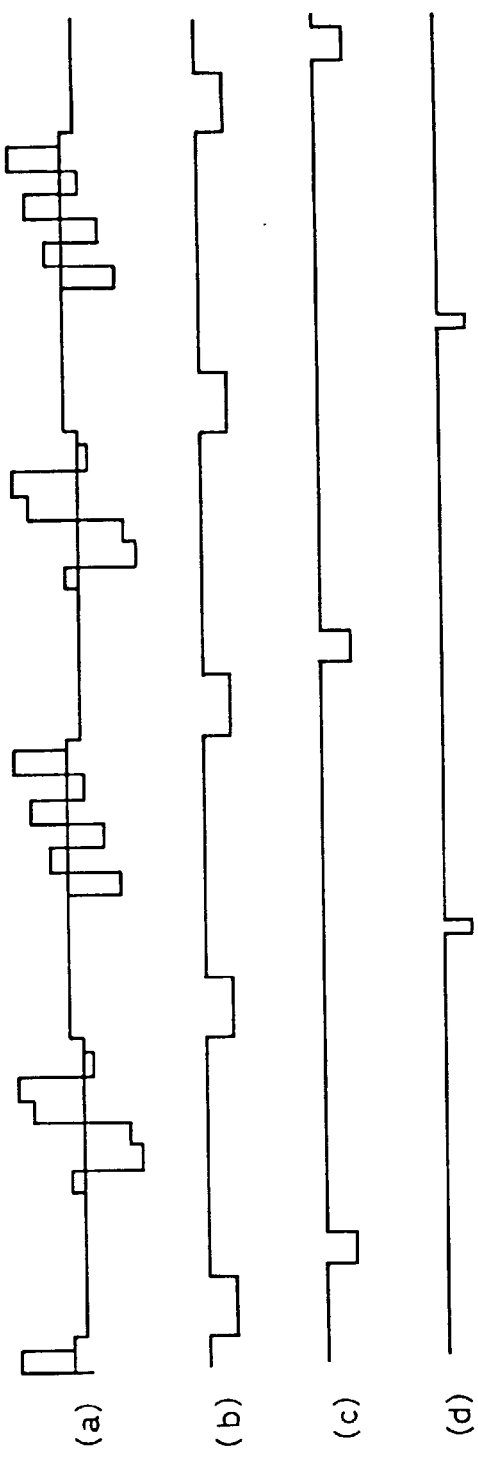
FIG. 3B is a time chart of the color difference discrimination circuit.

The color difference discrimination circuit 150 operates as follows. The pedestal level, for example, of the signal B-Y of the line-sequence chrominance signals recorded on the magnet sheet has an offset value; therefore, the pedestal level is higher than the signal R-Y by a value equal to this offset value. Accordingly, during the above-mentioned clamping, the line-sequence color difference signals R-Y, B-Y can be discriminated, by comparing the n times added value of the data to be inputted during a back porch, with that 1H earlier or later. More specifically, (a) in FIG. 3B designates reproducing line-sequence chrominance signals to be inputted to the input terminal 300; (b), a horizontal synchronizing signal; (c), a clock pulse for controlling the latch circuit 314; (d), a clock to be impressed to the counter 318. The counter 318 is cleared to zero during the vertical synchronizing. The output of the latch circuit 304 is defined during a back porch and is held by the latching circuit 314 at the timing of (c) of FIG. 3B. The output of the latch circuit 304 is newly defined during the next back porch and is compared with the output of the latching circuit 314 by the comparator circuit 316. According to the compared result of the comparator circuit 316, the counter 318 is controlled so as to make a count or not. This procedure is done within the period of 1 field; the flag of the latching circuit 320 is defined according to whether the counted value of the counter 318 is larger than a predetermined value or not.

Thus, in order to perform an accurate color difference discrimination even in the presence of any noise or drop-out, the counter 318 makes a decision by majority within the period of 1 field so that it can be seen the individual signals R-Y and B-Y to be an even raster or an odd raster.

Figure 4B:
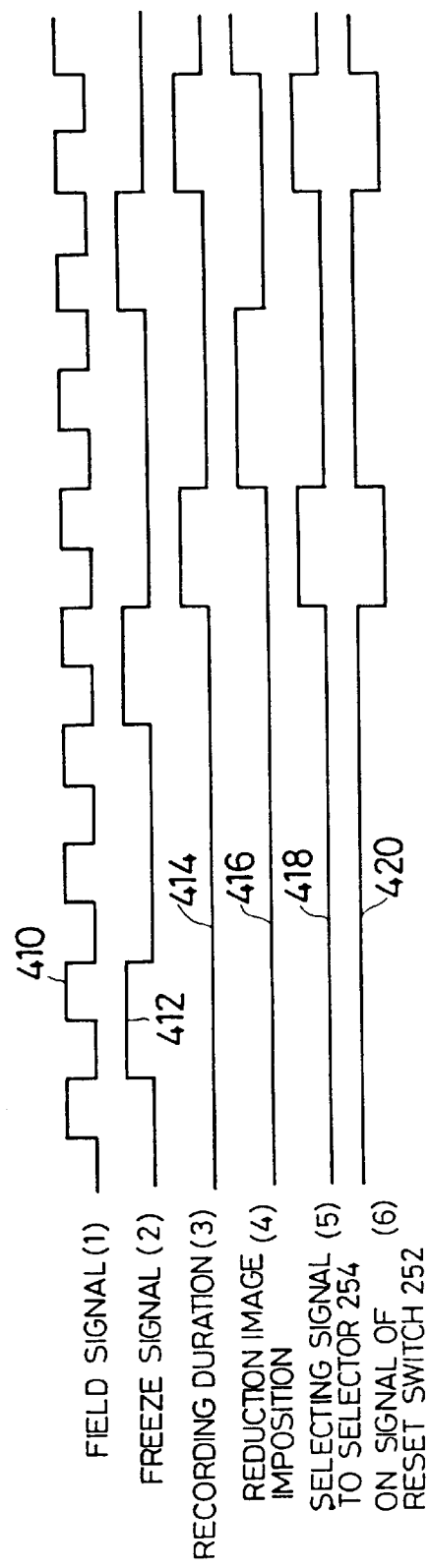
FIG. 4B is a time chart of the recording mode.
Figure 4A:
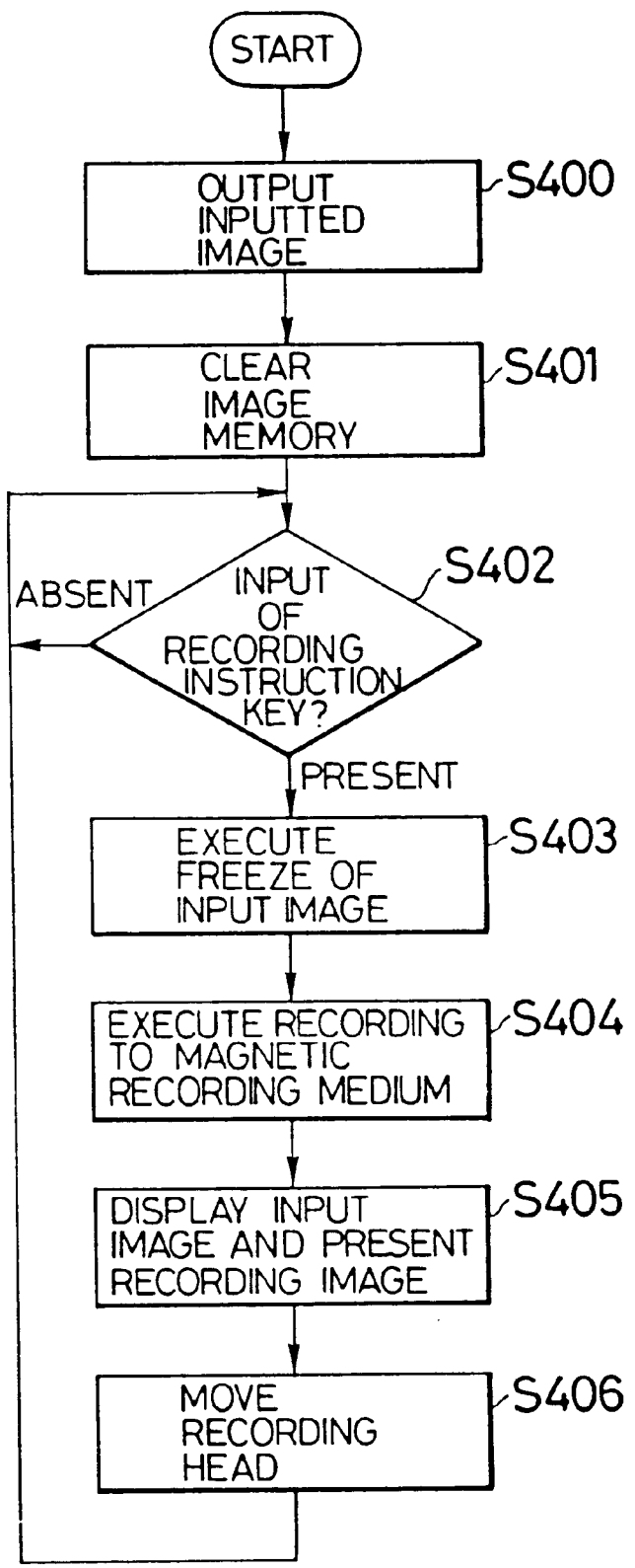
FIG. 4A is a flow chart of a recording mode.

In the construction of FIG. 2, there are a recording mode in which an input video signal is to be recorded on the magnetic sheet, and a reproducing mode in which a recorded video signal is to be reproduced from the magnetic sheet. The recording mode will be described first. FIGS. 4A and 4B are a flow chart and a time chart, respectively, of the recording mode. In FIG. 4B, reference numeral 410 designates a field signal to be outputted by the synchronizing signal generating circuits 248, 250; 412, a freeze signal; 414, a signal indicative of a recording time; 416, a signal of indicative of an overlapping time of a reduced image; 418, a selection signal of the selector 254 and indicating that the synchronizing signal generating circuit 250 has been selected; 420, a signal indicative of a reset state in which the reset switch 252 is on.

Subsequently, the selector 254 selects the synchronizing signal generating circuit 248, and the reset switch is on. Then the switch 232 is shifted to select the input video signal side so that the input video signal of the input terminal 210 is outputted, as it is, to the output terminal 236 (S400). The image memory of FIGS. 1A and 1B is cleared to a predetermined value (S401). For this purpose, in case of the image memory 116, the predetermined value is set in the latching circuit 112 and is selected by the selector 114, whereupon 1 frame of the predetermined value is written in the image memory 116 via the S-P-S converter circuit 118. Further, a value indicative of a blanking zone is set in the latching circuit 132 so as to satisfy all of the normal image zone, and a value indicative of a blanking zone is set in the latching circuit 134 so as to clear all of the memory space of the image memory 116. While the image memory 116 is being cleared, it is actuated according to the blanking signal by the latching circuit 134; otherwise, namely, in any step other than S401, it is actuated according to the blanking signal by the latching circuit 132.

In order to clear the image memory 162, with the latching circuit 320 set to exhibit the R-Y signals, predetermined values are set in the latching circuits 152, 154, and the selector 156 changes over the outputs of the latching circuits 152, 154 at the timing of the horizontal synchronizing signal; then the selector 158 selects this. And 1 frame of the R-Y signals is written in the image memory 162. At that time, the writing to the image memories 162a, 162b is changed over for every raster. Also the blanking zone of the blanking signal generating circuit 130 is set so as to clear completely the memory space of the image memory 162 in the same manner as in the case of the image memory 116. As a result, the image memory 162a is completely cleared to the preset value of the latching circuit 152, while the image memory 162b is cleared to the preset value of the latching circuit 154. Thus the image memories 162a, 162b have become a R-Y memory and a B-Y memory, respectively.

As a command for the recording of the input video signal to the magnetic sheet is inputted (S402), 1 frame of a brilliance signal of the input video signal is written in the image memory 116 via the A/D converter 100, the clamping circuit 102, the selectors 110, 114 and the S-P-S converter circuit 118. At that time, the image memory 162 is actuated according to the blanking signal by the latching circuit 132, the blanking signal being indicative of the image zone of the input brilliance signal.

Meanwhile, the input chrominance signals are converted into line-sequence signals by the switch 214. At that time, any one of the R-Y component and the B-Y component may come first as desired; however, since when clearing, the latching circuit 320 has been set so as to exhibit R-Y signals, the R-Y component should come first in this example. 1 frame of the line-sequence chrominance signals are written in the image memory 162 via the A/D converter, the clamp circuit 102, the selectors 110, 158 and the latching circuit 160, as shown in FIG. 1B. At that time, in order to memorize the image zone of the input line-sequence chrominance signal completely, the image memory 162 is actuated according to the blanking signal by the latching circuit 132. After the termination of the blanking time in the vertical direction, the image data of the first raster to be memorized is stored in the image memory 162a, and then the image data of the second raster is stored in the image memory 162b, and thereafter, the image data are written one raster after another alternately in the image memories 162a, 162b. As a result, the R-Y component of the input line-sequence chrominance signal has been written in the image memory 162a, and the B-Y component has been written in the image memory 162b (S403).

Then, the selector 254 selects the output of the synchronizing signal generating circuit 250, and the reset switch is off. The image data in the image memories 116, 162 are read out and are recorded on the magnetic sheet (S404). Specifically, in FIG. 1B, the image data memorized in frame in the image memory are read out from the S port, and are impressed to the D/A converter 128 via the latching circuit 120 and the selectors 122, 126. When recording, in frame on the magnetic sheet, the framed image memorized in the image memory 116, the output of the D/A converter 128 is recorded only for 1 frame. When recording the image as a field image, an addition and an average of the image data are made between the adjacent fields before being recorded. Adding and average-taking between the fields correspond to perform a filtration process between the fields.

More specifically, the first field signal of the image data memorized in frame in the image memory 116 is read out from the first raster in the order of $Y_0, Y_1, Y_2, Y_3, Y_4, \ldots$ from the S port by the S address generating circuit 138. Simultaneously, the second field signal is read out along the successive rasters from the first raster in the order of $Y_0', Y_1', Y_2', Y_3', Y_4', \ldots$ from the P port by the P address generating circuit 136. The selector 126 selects the output of the adder 124. As a result, the output of the D/A converter 128 is $(Y_0+Y_0')/2, (Y_1+Y_1')/2, (Y_2+Y_2')/2, (Y_3+Y_3')/2, (Y_4+Y_4')/2, \ldots$, and this output is recorded as 1 field.

In the meantime, the chrominance signals are processed as follows. In FIG. 1B, the image data memorized in frame in the image memory 162 are read out along the rasters two rasters at a time in the order of $RY_0, RY_0, RY_2, RY_2, RY_4, RY_4, RY_6, RY_6, \ldots$ $BY_1, BY_1, BY_3, BY_3, BY_5, BY_5, BY_7, BY_7, \ldots$ from the S port.

By the action of the latching circuit 164 and the selectors 174 through 180, the D/A converters 182, 184 outputs normally the R-Y and B-Y signals, respectively.

When recording, in frame on the magnetic sheet, the image memorized in the image memory 162, the switch 238 (FIG. 2) selects the alternate image data components R-Y, B-Y from the R-Y component for the first raster, then the B-Y component for the second raster, and so forth in line sequence, i.e. in the order of RY0, BY1, RY2, BY3, RY4, BY5, RY6, BY7, . . . Then 1 frame of these data components are recorded on the magnetic sheet. At that time, additional reading may be done from the P port, thus enabling simultaneous reading described below.

On the other hand, in the field recording, the added value and the average value of the image data between the fields are obtained for recording. Specifically, one field of the image data recorded in frame in the image memory 162 is read out from the S port along the rasters two at a time in the order of $RY_0, RY_0, RY_2, RY_2, RY_4, RY_4, RY_6, RY_6, \ldots$ $BY_1, BY_1, BY_3, BY_3, BY_5, BY_5, BY_7, BY_7, \ldots$ Simultaneously with this, the other field of the image data are read out then from the P port along the alternate rasters R-Y and B-Y, i.e. in the order of $RY_0', BY_1', RY_2', BY_3', RY_4', BY_5', \ldots$ Each of the selectors 174, 176 changes over the input signal at every raster, and the selectors 178, 180 change over in such a manner that the D/A converters 182, 184 output normally the R-Y and B-Y signals, respectively. As a result, the D/A converter 182 outputs $(RY_0+RY_0')/2, RY_0, (RY_2+RY_2')/2, RY_2, (RY_4+RY_4')/2, RY_4, \ldots$, and the D/A converter 184 outputs BY1, $(BY_1+BY_1')/2, BY_3, (BY_3+BY_3')/2, BY_5, (BY_5+BY_5')/2, \ldots$ Now, if the switch 238 changes over from the R-Y component, exhibited by the latching circuit 164, alternately at every other rasters, the rasters for addition and average-taking normally come. As a result, the switch 238 outputs $(RY_0+RY_0')/2, (BY_1+BY_1')/2, (RY_2+RY_2')/2, (BY_3+BY_3')/2, (RY_4+RY_4')/2, (BY_5+BY_5')/2, \ldots$ 1 field of these data is recorded on the magnetic sheet.

Subsequently, the selector 254 selects the output of the synchronizing signal generating circuit 248 again, and the reset switch 252 is on. Then the image memorized in the image memories 116, 162 is read out as reduced, and is overlapped over the input video signal (S405). Specifically, in FIG. 1A, the image data memorized in frame in the image memory 116 are read out from the S port, and three image elements of the data are held in the latching circuit 120. The selector 122 selects only one of these three image elements. As the reading from the S port is performed at the video rate, the memorized image in the memory 116 is reduced to ⅓ in the horizontal direction. Further, by having the vertical address signal by the S address generating circuit 138 designate every third addresses, the memorized image in the image memory 116 can be reduced to ⅓ in the vertical direction.

Further, in FIG. 1B, the image data memorized in frame in the image memory 162 are read out from the S port along the R-Y and B-Y rasters two at a time. Partly because the color difference signal has only a narrow band, and partly because the narrow-band color difference signal is memorized at a speed equal to ⅓ of the normal video rate, the memorized image in the image memory 162 is reduced to ⅓ horizontally if it is read out at the normal video rate. Moreover, by having the vertical address signal by the S address generating circuit 138 designate the addresses at every third steps, the data are read out from the S port along the rasters two at a time in the order of $RY_0, RY_2, RY_6, RY_8, RY_{12}, RY_{14}, \ldots$ $BY_1, BY_3, BY_7, BY_9, BY_{13}, BY_{15}, \ldots$ As a result, the memorized image in the image memory 162 is reduced to ⅓ vertically.

Figure 5A:
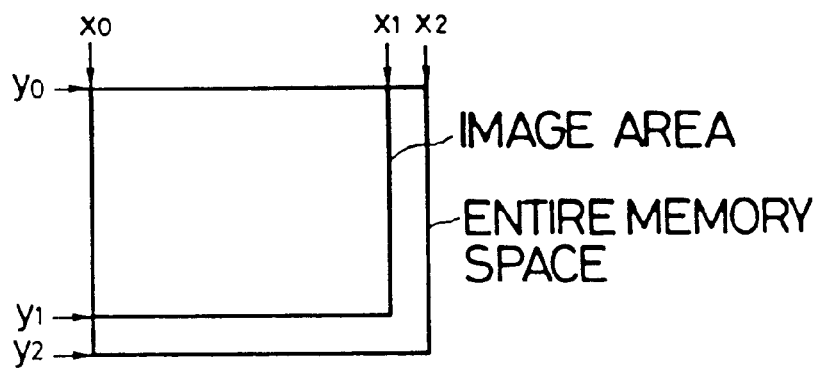
FIGS. 5A, 5B and 5C illustrate a picture-in-picture display.
Figure 5B:
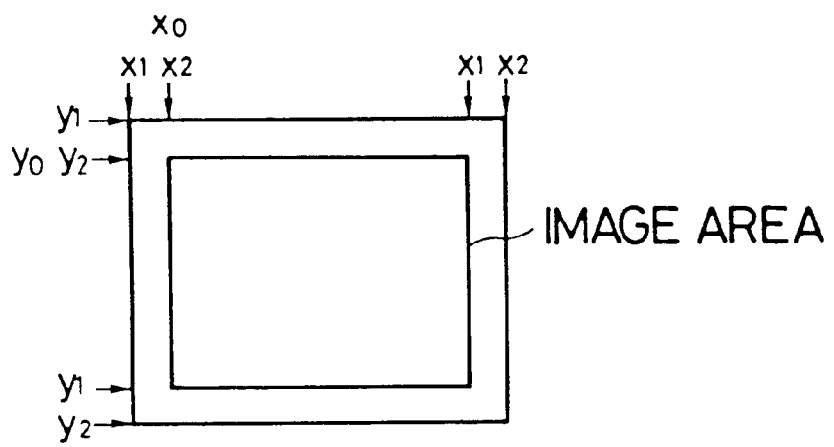
Figure 5C:
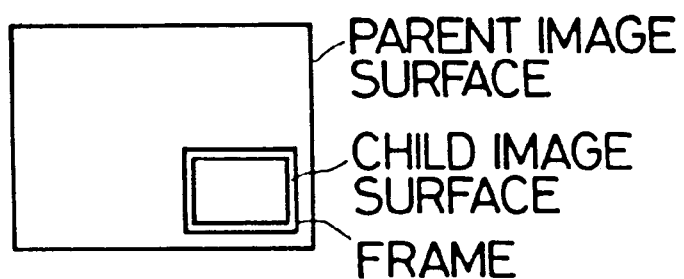
Figure 8A:
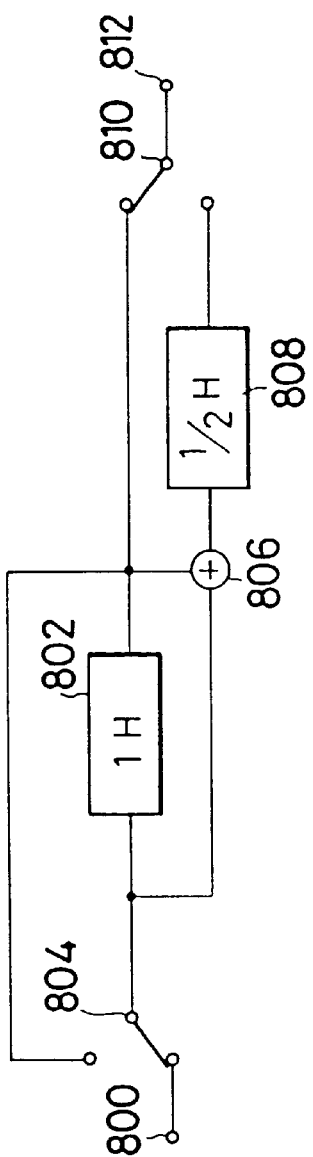
FIGS. 8A and 8B are block diagrams of a conventional construction.
Figure 8B:
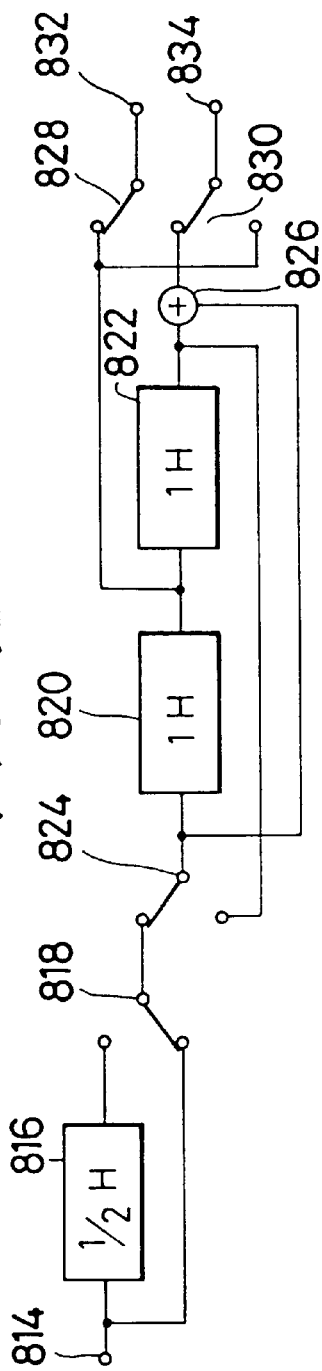
Figure 9:
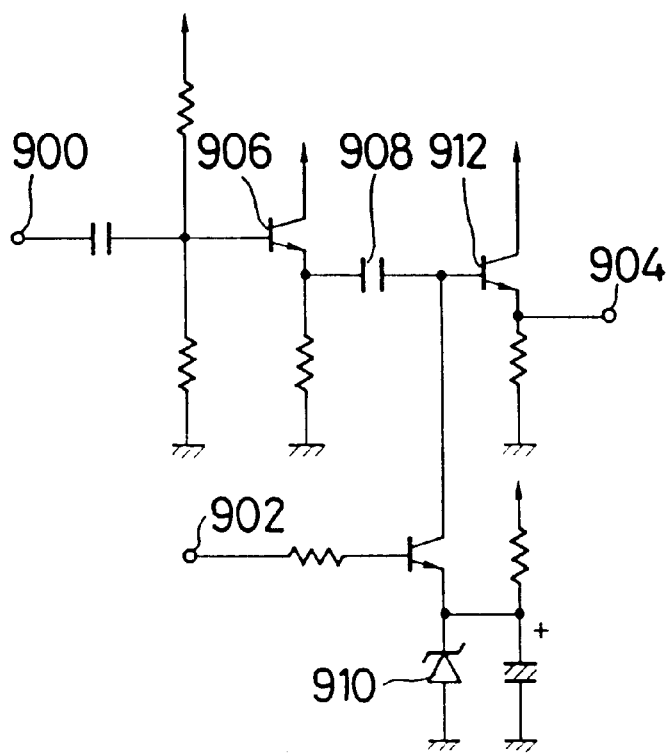
FIG. 9 is a block diagram of a conventional clamp circuit.
Figure 10:
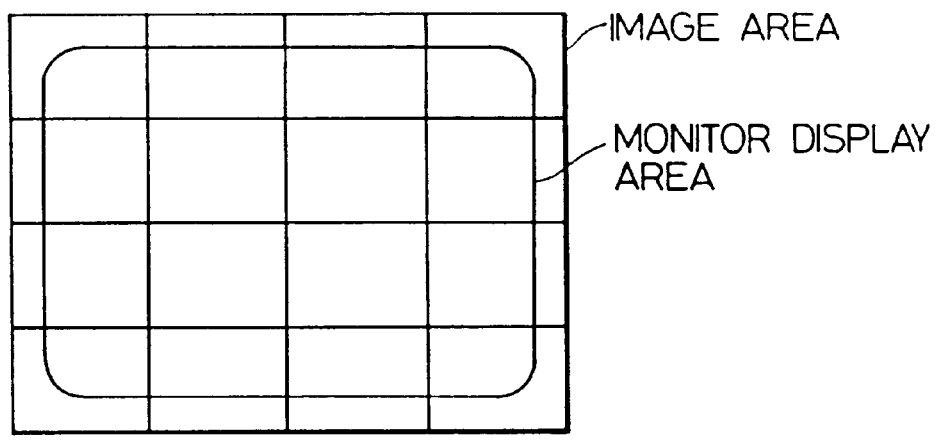
FIG. 10 illustrates the relationship between an image zone and a monitor display zone in a conventional memory.

In FIG. 5A, if of the entire space in the image memories 116, 162, the zone outside the image is read out both horizontally and vertically, the image reduced to ⅓×⅓ can be framed easily. Specifically, as shown in FIG. 5B, the S address generating circuit 138 outputs the horizontal address normally by $x_0 \rightarrow x_1$; but here in the embodiment, it outputs by $x_1 \rightarrow x_2(=x_0) \rightarrow x_1 x_2$. Likewise, the vertical address is outputed normally by $y_0 \rightarrow y_1$, but here in the embodiment, it is outputted by $y_1 \rightarrow y_2(=y_0) \rightarrow y_1 \rightarrow y_2$. As a result, as shown in FIG. 5B, the image can be framed. When displaying the reduced image, the switch 232 is connected to the output of the image memory circuits 228, 230. Further, if the switch 232 is connected to the input video signal side (decorder 212), the reduced image can be overlapped over the input image, as shown in FIG. 5C.

As a result, the control signal of the switch 232 becomes to be equal to the blanking signal of the blanking signal generating circuit 130, and it is possible to move the overlapping position of the reduced image by varying the blanking signal. Now, a new value is set in the latching circuit 134 so that the blanking signal can be varied.

Then the recording heads 241, 242 are moved (S406) to their stand-by position where the recording heads 241, 242 wait until the next recording command is inputted. Thereafter, the above-mentioned procedures are repeated.

FIG. 4B is a time chart when the input video signals are to be recorded in frame on the magnetic sheet, showing the case in which clearing of the image memories 116, 162 and recording onto the magnetic sheet are performed two times.

The reproducing mode will be described as follows. FIG. 6A is a flow chart of the reproducing mode, and FIGS. 6B and 6C are time charts of the reproducing mode. Reference numerals 610, 612 designate field signals generated by the synchronizing signal generating circuits 248, 250, respectively; 614, a signal indicative of the chrominance discrimination time of the reproduction line-sequence signal; 616, a freeze signal; 618, a control signal for controlling the selection of the selector 254, showing that the selector 254 has selected the synchronizing signal generating circuit 250; 620, a signal indicative of the state of the reset switch 252 (which is operative to reset, if it is on).

Since the synchronizing signal generating circuit 248 is synchronized with the horizontal synchronizing signal of the reproduction video signal reproduced from the magnetic sheet 215 and is reset by the vertical synchronizing signal, the circuit 248 outputs a synchronizing signal similar to the synchronizing signal of the reproduction video signal. Further, partly because the motor 292 for rotating the magnetic sheet 215 is rotatable in synchronizm with the vertical synchronizing signal outputted from the reference synchronizing signal generating circuit 250, and partly because the reset switch 252 is off, the vertical synchronizing signal of the reproduction video signal reproduced from the magnetic sheet 215 is synchronized with the vertical synchronizing signal outputted from the reference synchronizing signal generating circuit 250. In case of the field image, the fields coincide with one another at every field; but, if the reproduction image is a framed image, there is a possibility that the fields do not coincide with one another both at the synchronizing signal generating circuit 248, 250. In the case where the signal recorded on the magnetic sheet 215 is a frame one, assume that the various synchronizing signals generated from the synchronizing signal generating circuit 248, and also the various synchronizing signals generated from the reference synchronizing signal generating circuit 250 are changed over. When the fields do not coincide with one another between these synchronizing signals as discussed above, a skew would occur at the time of change-over of the synchronizing signals.

Consequently, first of all it is a must to have the fields coincide with one another (S600). Specifically, the video signal recorded as two fields on two tracks of the magnetic sheet 215 are reproduced alternately with the assistance of the switch 218; thereby frame reproduction is performed. At that time, if the comparator circuit 256 detects that the fields do not coincide with one another, this frame reproduction is stopped for the period of 1V. As the change-over of the switch 218 is stopped for the period of 1V, the fields coincide with one another. Thereafter, the two fields are discriminated individually by the color difference discrimination circuit 150, and these discriminated results are memorized in the ratching circuit 320 (S601). Now, having the selector 254 select the synchronizing generating circuit 248 and having the reset switch 252 off, the reproduction video signal is freezed.

In the case where the signals recorded on the magnetic sheet 215 is field signals, the reproduction video signal is normally a single field, but the reference synchronizing signal generating circuit 250 generates a synchronizing signal of a framed image as the reset switch is off. Therefore, the fields coincide with one another at every field; if the synchronizing signals of the synchronizing signal generating circuits 248, 250 are changed over when there is no coincidence of the fields, a skew would occur. This is the reason why firstly it must have the field coincide with one another (S600). Specifically, when disconsistence of the fields is detected by the comparator circuit 256, the image memory circuits 228, 230 are controlled so as to stand by for the period of 1V so that the field can coincide with one another. Thereafter, a discrimination is performed by the color difference discrimination circuit 150 for the period of 1V, and this discriminated results are memorized in the latching circuit 320. At that time, the fields is not coincident with one another (S601). The selector 254 now selects the synchronizing signal generating circuit 248, and the reproduction video signals are freezed for the period of the next 1V, at that time the fields are coincident with one another.

In FIG. 1A, a frame or a field of the reproduction brilliance signals are written in the image memory 116 from the P port, via the A/D converter 100, the clamping circuiting 102, the selectors 110, 114 and the S-P-S converter circuit 118, in the order of $Y_0, Y_1, Y_2, Y_3, Y_4, Y_5, \ldots$ This signal is read out from the S port in the order of $Y0, Y0, Y_1, Y_2, Y_3, Y_4, \ldots$, and is outputted to the output terminal 236 via the selector 126, the D/A converter 128, the switch 232 (FIG. 2) and the encoder 234 (FIG. 2). Meanwhile, the output of the selector 122 is impressed to the selector 110; this is the image data of the previous raster of the reproduction brilliance signal to be inputted. If there is any drop-out also in the reproduction video signal, the selector 110 selects the image data of this previous raster during that time, thus compensating the drop-out.

In FIG. 1B, assume that the reproduction line-sequence color difference signal is inputted to the image memory 162 from the R-Y component in the order of RY0, BY1, RY2, BY3, RY4, BY5, RY6, BY7, . . . via the A/D converter 100, the clamping circuit 102, the selector 110, 158 and the latch circuit 160. 1 frame or 1 field of this image data is stored in the image memories 162a, 162b from the P port alternately every other rasters. Then this signal is read out from the S port along the rasters two at a time in the order of $RY_0, RY_0, RY_0, RY_0, RY_2, RY_2, RY_4, RY_4, \ldots$
$BY_1, BY_1, BY_1, BY_1, BY_3, BY_3, BY_5, BY_5, \ldots$
Further, these image data are distributed to the D/A converters 182, 184 in such a manner that the D/A converters 182, 184 output normally the R-Y and B-Y components, respectively, with the assistance of the selectors 174, 176, 178, 180. The selector 166 selects the image data in the order of $RY_0, BY_1, RY_0, BY_1, RY_2, BY_3, RY_4, BY_5, RY_6, BY_7, \ldots$, this output is impressed also to the selector 110. This is the image data of the raster before the previous raster of the reproduction line-sequence chrominance signal to be inputted. If there is any drop-out in the reproduction video signal, the selector 110 selects the image data of the raster before the previous raster, thus compensating the drop-out (S602).

Subsequently, in FIG. 1A, the reproduction brilliance signal is inputted to the A/D converter 100, and the selector 110 selects the output of the adder 108, and 1 frame or 1 field of the signal is freezed in the image memory 116. Concurrently, the same field as the field of the reproduction brilliance signal is read out from the S port in the order of $Y_0, Y_1, Y_2, Y_3, Y_4, Y_5, \ldots$ The product by multiplying the data and by the modulus K (0<K<1) by the multiplier 104, and the product by multiplying the reproduction brilliance signal by the modulus (1−K) by the multiplier 106, are added by the adder 108. At that time, if any drop-out is detected in the reproduction brilliance signal by the drop-out detecting circuit 295, the selector 110 selects the output of the selector 122 during that time to compensate the drop-out.

In FIG. 1B, the reproduction line-sequence chrominance signal is inputted in the A/D converter 100, and the selector 110 selects the output of the adder 108, and 1 frame or 1 field of the image data is freezed in the image memory 162. At that time, the same field as that of the reproduction line-sequence chrominance signal is read out from the S port along the rasters two at a time in the order of $RY_0, RY_0, RY_2, RY_2, RY_4, RY_4, RY_6, RY_6, \ldots$
$BY_1, BY_1, BY_3, BY_3, BY_5, BY_5, BY_7, BY_7, \ldots$ The selector 166 selects these data and outputs in the order of $RY_0, BY_1, RY_2, BY_3, RY_4, BY_5, RY_6, BY_7, \ldots$
The product by multiplying these data by the modulus K (0<K<1) by the multiplier 104, and the product by multiplying the reproduction line-sequence chrominance signal by the modulus (1−K) are added by the adder 108. If there is any drop-out in the reproduction line-sequence chrominance signal, the selector 110 selects the output of the selector 166 during that time, thus compensating the drop-out.

As the foregoing operation is done during the period of several V, the image data of the same still image reproduced from the magnetic sheet 215 are added several times so that any random noises can be reduced (S603). If the reproduction video signal is a frame signal, the above-mentioned operation should be done in frames. In case of field, when the field of the reproduction video signal coincides with the field of the synchronizing signal generating circuit 250, the above-mentioned operation takes place, and when the fields are not coincident with one another, an inter-field compensation described below is performed before reading out the data in the image memories 116, 162.

FIG. 6B is a time chart in case where the reproduction video signal is a framed signal, showing the case in which noises are not reduced, and also the case in which noises are reduced along four frames. FIG. 6C is a time chart in case where the reproduction video signal is a field, showing the case in which noises are not reduced, and also the case in which noises are reduced along four frames.

Then, the memorized data of the image memories 228, 230 are read out (S604). In case of the brilliance signal, in FIG. 1A, the memorized data are read out from the S port of the image memory 116 according to the address signal from the S address generating circuit 138. This read-out signal is impressed to the D/A converter 128 via the selectors 122, 126. If the memorized image of the image memory 116 is a framed image, the data are read out alternately one field after the other. Further, in case of the field image, the read-out signal can be used as it is for one field, while an inter-field compensation should be done before using for the other field. Specifically, in using the image memorized in an odd field of the image memory 116, when the image data are to be outputted as an odd field signal, the data are read out from the S port of the image memory 116 along the rasters in the normal order of $Y_0, Y_1, Y_2, Y_3, Y_4, Y_5, Y_6, \ldots$ and are then outputted via the selectors 122, 126 and the D/A converter 128. When the image data are to be outputted as an even field signal, the data are read out from the S port of the image memory 116 in the order of $Y_0, Y_1, Y_2, Y_3, Y_4, Y_5, Y_6, \ldots$ and at the same time, the data are read out, the time of 1 line behind, from the P port in the order of $Y_1, Y_2, Y_3, Y_4, Y_5, Y_6, \ldots$ The output of the S port and the output of the P port are added and averaged by the adder 124, and the selector 126 selects the output of this adder 124. As a result, the output of the D/A converter 128 is $Y_0, Y_1, Y_2, Y_3, Y_4, Y_5, Y_6, \ldots$ in an odd field, and $(Y_0+Y_1)/2, (Y_1+Y_2)/2, (Y_2+Y_3)/2, (Y_3+Y_4)/2, (Y_4+Y_5)/2, \ldots$ in an even field; the latter is an interpolating value between the fields.

Further, in the case where the signal memorized in an even field of the image memory 116 is employed, if the signal is to be outputted as an even field signal, the data are read out from the P port of the image memory 116 along the rasters in the normal order of $Y_0, Y_1, Y_2, Y_3, Y_4, Y_5, Y_6, \ldots$ and if the signal is to be outputted as an odd field, the data are read out from the S port of the image memory 116 in the order of $Y_0, Y_0, Y_1, Y_2, Y_3, Y_4, Y_5, \ldots$ and, at the same time, the data are read out, 1 raster advance, from the P port along the successive rasters in the normal order. The output of this S port and the output of the P port are added and averaged by the adder 124, and the selector 126 selects the output of this adder 124. As a result, the output of the D/A converter 128 is $(Y_0+Y_0)/2, (Y_0+Y_1)/2, (Y_1+Y_2)/2, (Y_2+Y_3)/2, (Y_3+Y_4)/2, (Y_4+Y_5)/2,$ in an odd field, and $Y_0, Y_1, Y_2, Y_3, Y_4, Y_5, Y_6, \ldots$ in a level field; the former is an interpolating value between the fields.

The mode of operation in connection with the chrominance signal is as follows. Since the input signal to the image memory circuit 230 is a line-sequence chrominance signal, it is required to make a line-simultaneousness. Specifically, in FIG. 1B, if the line-sequence chrominance signal to be inputted to the image memory 162 is $RY_0, BY_1, RY_2, BY_3, RY_4, BY_5, RY_6, BY_7, \ldots$ and hence starts with the R-Y component every other rasters, the R-Y components $RY_0, RY_2, RY_4, RY_6, \ldots$ are memorized in the image memory 162a, while the B-Y components $BY_1, BY_3, BY_5, BY_7, \ldots$ are memorized in the image memory 162b. The latching circuit 320 of the color difference discrimination circuit 150 assumes a state so as to indicate that the first raster is a R-Y component. And the memorized data of the image memory 162 are read out from the S port along the rasters two at a time in the order of $RY_0, RY_0, RY_2, RY_2, RY_4, RY_4, RY_6, RY_6, \ldots$
$BY_1, BY_1, BY_3, BY_3, BY_5, BY_5, BY_7, BY_7, \ldots$ At the same time, the memorized data are read out also from the P port alternately along the R-Y rasters and the B-Y rasters in the order of $BY_1, RY_2, BY_1, RY_4, BY_3, RY_6, BY_5, \ldots$ Both the selectors 174, 176 change over the input signal at every other rasters, while the selectors 178, 180 change over in such a manner that the D/A converters 182, 184 outputs normally the R-Y signals and the B-Y signals, respectively. As a result, the D/A converter 182 outputs $RY0, (RY_0+RY_2)/2, RY_2, (RY_2+RY_4)/2, RY_4, (RY_4+RY_6)/2, \ldots$, and the D/A converter 184 outputs $(BY_1+BY_1)/2, BY_1, (BY_1+BY3)/2, BY3, (BY3+BY5)/2, BY5, \ldots$, thus establishing the chrominance signals line-simultaneous.

Further, if the line-sequence chrominance signal to be inputted in the image memory circuit 230 starts with a B-Y component, the B-Y components $BY_0, BY_2, BY_4, BY_6, \ldots$ are memorized in the image memory 162a, while the R-Y components $RY_1, RY_3, RY_5, RY_7, \ldots$ are memorized in the image memory 162b. The latching circuit 320 of the color difference discrimination circuit 150 assumes a state so as to indicate that the first raster is a B-Y component. And the memorized data of the image memory 162 are read out from the S port along the rasters two at a time in the order of $BY_0$, $BY_0$, $BY_2$, $BY_2$, $BY_4$, $BY_4$, $BY_6$, $BY_6$, . . .
$RY_1$, $RY_1$, $RY_3$, $RY_3$, $RY_5$, $RY_5$, $RY_7$, $RY_7$, . . .

At the same time, the memorized data are read out also from the P port alternately along the R-Y rasters and the B-Y rasters in the order of $RY_1$, $BY_2$, $RY_1$, $BY_4$, $RY_3$, $BY_6$, $RY_5$, . . . With the assistance of the change-over of the selectors 174 through 180, the D/A converter 182 outputs $(RY_1+RY_1)/2$, $RY_1$, $(RY_1+RY_3)/2$, $RY_3$, $(RY_3+RY_5)/2$, $RY_5$, . . . , while the D/A converter 184 outputs $BY_0$, $(BY_0+BY_2)/2$, $BY_2$, $(BY_2+BY_4)/2$, $BY_4$, $(BY_4+BY_6)/2$, . . .

If the memorized image of the image memory 162 is a framed image, the above-mentioned operation is done for each field. In the case of a field image, the above-mentioned operation is done twice for one field (S604).

Subsequently, the reproducing heads 216, 217 are moved (S605) to a stand-by position where they wait until the next reproduction command is issued. Thereafter, the foregoing procedures are repeated.

In the reproducing mode discussed above, the operation is controlled by the latching circuit 132 which exhibits the blanking zone, and the output held by this latching circuit 132 satisfies the image zone of the reproduction video signal completely.

Further, in the reproducing mode, the reproduction image is reduced and then recorded in the image memories 116, 162 in the following manner. FIG. 7A is a flow chart of the reproducing mode. The time chart of the reproducing mode is omitted here because it is just the same as that of FIG. 6C in which the reproducing video signal is a field and in which noises are not reduced.

First of all, the image memories 116, 162 are cleared to a predetermined value (S700). Then the reproduction video signal of the field image and the reference synchronizing signal generating circuit 250 are made coincident with one another in field (S701), and a discrimination is performed by the color difference discrimination circuit 150 during the period of 1V (S702). The detailed description in connection with this is omitted here because it is just the same as previously discussed. Subsequently, the selector 254 selects the synchronizing signal generating circuit 248 so that the image of the reproduction video signal is reduced and then written in the image memories 116, 162 during the period of 1V (S703). Specifically, in FIG. 1B, assume that the reproduction line-sequence chrominance signal is $RY_0$, $BY_1$, $RY_2$, $BY_3$, $RY_4$, $BY_5$, $RY_6$, $BY_7$, . . . , in which a R-Y component comes first every other rasters. For example, when this image is to be reduced to a ⅕×⅕ field image and to be memorized in the image memory 162, a clock pulse for generating a horizontal address signal of the P address generating circuit 136 is divided in frequency to ⅕ in order to multiply the original image by ⅕ horizontally, and a horizontal synchronizing signal for generating a vertical address signal of the P address generating circuit 136 is divided in frequency to ⅕ in order to multiply the original image by ⅕ vertically. Specifically, every fifth rasters from the reproduction line-sequence chrominance signal and also alternate rasters from the R-Y components are sampled, and the rest of the data are cut off. For example, the rasters $RY_0$, $BY_5$, $RY_{10}$, . . . or the rasters $RY_0$, $BY_1$, $RY_{10}$, $BY_{11}$, . . . , are sampled from the rasters $RY_0$, $BY_1$, $RY_2$, $BY_3$, $RY_4$, $BY_5$, $RY_6$, $BY_7$, $RY_8$, $BY_9$, $RY_{10}$, $BY_{11}$, . . . The rest of the data having cut off are normally stored at the lowermost raster zone of the memory space in the image memory 162 for compensating any drop-out; the R-Y components are stored at the lowermost raster zone of the image memory 162a, while the B-Y components are stored at the lowermost raster zone of the image memory 162b. Concurrently with this writing, the lowermost raster zone of the memory space in the image memory 162 is read out from the S port two rasters at a time, whereupon the read-out rasters are alternately selected by the selector 166 for using in compensation of any drop-out as discussed previously.

From the foregoing, it should be understood that a reduced image of ⅕×⅕ from the reproduction line-sequence chrominance signal of the field image can be memorized in the image memory 162 as a field image.

Further, when a framed image on a reduced scale of ⅕×⅕ is to be memorized in the image memory 162, the original image is multiplied by ⅕ horizontally as discussed previously. To multiply the original image by ⅕ vertically, a horizontal synchronizing signal for generating a vertical address signal of the P address generating circuit 136 is divided in frequency to ⅖, or other equivalent rate; that is, two rasters from every five rasters of the reproduction line-sequence chrominance signal and also two rasters from the R-Y components are sampled. For example, $RY_0$, $RY_2$, $BY_5$, $BY_7$, $RY_{10}$, $RY_{12}$, . . . , or $RY_0$, $RY_2$, $BY_7$, $BY_9$, $RY_{10}$, $RY_{12}$, . . . are sampled. And the fields are changed over alternately every other rasters. In the former case, $RY_0$, $BY_5$, $RY_{10}$, . . . are stored in odd fields of the image memory 162, while $RY_2$, $BY_7$, $RY_{12}$, . . . are stored in even fields of the image memory 162. The rest of the rasters having cut off is stored at the lowermost raster zone in the memory space of the image memory 162 as described previously; these cut rasters may be read out from the S port for using in compensation of any drop-out in the reproduction video signal.

By the above-mentioned operation, a reduced image of ⅕×⅕ from the reproduction line-sequence chrominance signal of the field image can be memorized in the image memory 162 as a framed image.

By varying an initial value of the P address generating circuit 136, it is possible to locate and memorize the reduced image at a voluntary position in the memory of the image memory 162. However, since the image memory 162 is an apparent line-sequence color difference memory, it is necessary to store the image data in the image memory 162 from the R-Y rasters.

The same token can be adopted to the reproduction brilliance signal. In order to reduce the original image horizontally, a clock pulse for generating a horizontal address signal of the P address generating circuit 136 is divided in frequency to ⅕; for the vertical reduction, the rasters of the brilliance signal corresponding to the raster of the reproduction line-sequence chrominance signal written in the image memory 162 is stored in the image memory 116. Any dropout in the signal can be compensated in the same manner as discussed previously. If a new value is set in the latching circuit 134 in such a manner that a zone smaller than the image zone of the reproduction video signal to be determined by the latching circuit 132 can be memorized, it is possible to memorize the reduced image in the image memory with the assistance of the blanking signal.

Assume that the reproduction line-sequence color difference signal is inputted alternately along the B-Y rasters and the R-Y rasters in the order of $BY_0$, $RY_1$, $BY_2$, $RY_3$, $BY_4$, $RY_5$, $BY_6$, $RY_7$, $BY_8$, . . . , in which the B-Y component comes first. In that case, the blanking zone is set as shifted by a single raster so that the previous output commencing with the B-Y component can be supposed as $RY_1, BY_2, RY_3, BY_4, RY_5, BY_6, RY_7, BY_8, \ldots$, in which the R-Y component comes first. Then the same operation as discussed above can take place.

Subsequently, the selector 254 selects the reference synchronizing signal generating circuit 250 to read out the image memories 116, 162 (S704). At that time, the selector 254 is operated according to the blanking signal by the latching circuit 132. Further, by memorizing a reduced image while the reproducing track of the magnetic sheet 215 is moved (S704), 25 (5×5) sheets of field images or framed images can be obtained.

Of course, the reduced scale is not limited to the specific value in the illustrated embodiment.

As is apparent from the foregoing description, in the present invention, the line-sequence color difference signals are processed line-simultaneously in a digital fashion by using an image memory or memories in place of delay lines and line memories, eliminating all of the problems of the conventional arrangement which employing analog circuits. Further, since gate-array devices can be used in place of various conventional relatively large-sized circuits, it is possible to reduce the entire size of the apparatus and hence the cost of production.

According to the illustrated embodiment, since interpolation between the fields of the video signal is realized in a digital fashion by using an image memory or memories.

Further, partly since the input video signal is partially cut off commensurate with a predetermined coefficient of reduction, and partly since the image data are stored in the image memory in line sequence from a predetermined chrominance component, it is possible to memorize a reduced image in the image memory as a field image. By writing in the image memory the image data along the rasters two at a time from a predetermined chrominance component in line sequence, it is possible to memorize a reduced image in a framed image.

If the blanking zone when writing and reading of the image in and from the image memory, for example, by framing the memorized image in the memory, it is possible to meet flexibly with various demands or requirements.

Moreover, even when the input video signal as a field image is to be stored in the image memory while the image data is being outputted from the memory, the input video signal is written in the memory at a timing such that the field of the input video signal is coincident with the field of the output image of the memory, it is possible to memorize the input image without causing any skew distortion.

In the case where the video signal to be inputted in the image memory is a framed image, when the field of the output image of the memory and the field of the input video signal are not coincident with one another, this inconsistence of the fields is detected by a field comparing means, and then the field of the reproduction video signal is rendered to coincide with the field of the memory before being inputted to the memory. Accordingly there would occur no skew distortion in the output image.

Another advantage of the present invention is that since after analog video signal has been digitalized, such digital video signal is clamped on digital circuits, precision in 1 LSB unit can be achieved easily with no additional adjustment. Clamping in 1 raster unit also can be achieved. Generally, a reproduction chrominance signal of t still video system is in line sequence and has an offset in the B-Y component; the present invention can be adopted to this system and can eliminate the offset. Further, even though a burst signal remains at the clamp position, accurate clamping can be performed. In processing the line-sequence chrominance signal, a difference in the output of the accumulating means creates between the rasters corresponding to the offset in the B-Y component, according to which difference it is possible to discriminate the color difference.

In an image recording system having an image memory, if a pre-filter is used between the fields, it is possible to record a jag-free natural image signal on the recording medium. Moreover, as one of the additional features of the present invention, the input video signal is memorized, as a framed image, in an image memory which is designed to meet the requirements of a still video system. Then the identical rasters of different fields are read out concurrently, and the read-out results are added and averaged. Recording is carried out while these precedures are being made during the period of 1 field. This feature can produce virtually the same effect as in the case where a filter is used between the fields in the framed image.

What is claimed is:

1. An apparatus for producing an image, comprising:

a producing unit, arranged for producing an image signal which sequentially includes a plurality of fields, the image signal being composed from a luminance component signal and a chrominance component signal;

a memory, arranged for storing the produced image signal produced by said producing unit, on an each signal component basis;

a detector, arranged for detecting whether or not a field of the produced image signal coincides with a field of the image signal read out from said memory; and a controller, arranged for controlling a timing for storing the produced image signal into said memory, so as to attain coincidence of the field of the produced image signal and the field of the image signal read out from said memory in a case that said detector detects that those two fields do not coincide with each other.

2. An apparatus according to claim 1, wherein said controller delays a timing of producing the image signal by said producing unit by a predetermined period corresponding to one field of the image signal.

3. An apparatus according to claim 1, wherein said controller delays a timing at which said memory stores the image signal by the predetermined period.

4. An apparatus according to claim 1, wherein said detector is adapted for comparing a synchronizing signal included in the produced image signal and a synchronizing signal included in the image signal read-out from said memory.

5. An apparatus according to claim 1, wherein said producing unit reproduces an image signal recorded on a recording medium to produce the produced image signal.

6. A method of producing an image, comprising:

a producing step of producing an image signal which sequentially includes a plurality of fields, the image signal being composed from a luminance component signal and a chrominance component signal;

a storing step of storing the produced image signal produced in said producing step, in a memory on an each signal component basis;

a detection step of detecting whether or not a field of the produced image signal coincides with a field of the image signal read out from said memory; and a control step of controlling a timing for storing the produced image signal into said memory in said storing step, so as to attain coincidence of the field of the produced image signal and the field of the image signal read out from said memory in a case that said detection step detects that those two fields do not coincide with each other.

* * * * *